United States Patent Office 2,841,597
Patented July 1, 1958

2,841,597

TRIANGULENE COMPOUNDS AND INTERMEDIATES THEREFOR

Eric Clar, Glasgow, Scotland, and David Gordon Stewart, Flixton, Manchester, England, assignors, by mesne assignments, to Shell Development Company, New York, N. Y., a corporation of Delaware No Drawing. Application March 13, 1953
Serial No. 342,288

17 Claims. (Cl. 260—362)

This invention relates to new products in the form of triangulene compounds which are valuable dyestuff intermediates and to further new products which serve as intermediates in the production of the triangulene compounds.

The invention also relates to processes for the production of the triangulene compounds and their intermediates.

It has been found that the carboxylic acids 2-carboxy-2′,4′,2″,4″-tetramethyltriphenylmethane and 2-carboxy-2′,5′,2″,5″-tetramethyltriphenylmethane, which may be obtained from di-(m-xylyl)-phthalide and di-(p-xylyl)-phthalide respectively by reduction, may be subjected to ring closure, for example by treatment with acid condensing agents, such as $H_2SO_4$, $ZnCl_2$, $AlCl_3$, to yield the hitherto unknown 1,3-dimethyl-9-(m-xylyl)-anthrone and 1,4-dimethyl-9-(p-xylyl)-anthrone, respectively.

It has further been found that the two anthrones referred to above may be oxidised respectively to the hitherto unknown 9-phenyloxanthranol-1,3,2′,4′-tetracarboxylic acid and 9-phenyloxanthranol-1,4,2′,5′-tetracarboxylic acid, for example by boiling with dilute nitric acid solution followed by treatment with alkaline potassium permanganate solution or by heating with nitric acid solution at super-atmospheric pressure.

It has still further been found that the tetracarboxylic acids referred to in the preceding paragraph may be reduced, e. g. with zinc dust in dilute caustic alkali solution, to yield the hitherto unknown 9-phenyl-9,10-dihydroanthracene-1,3,2′,4′-tetracarboxylic acid and 9-phenyl-9,10-dihydroanthracene-1,4,2′,5′-tetracarboxylic acid, respectively and that the latter may be subjected to ring closure, for example by treatment with acid condensing agents, such as $H_2SO_4$, $ZnCl_2$, $AlCl_3$, to yield hitherto unknown quinones, namely triangulene-4,8-quinone-6,10-dicarboxylic acid and triangulene-4,8-quinone-7,11-dicarboxylic acid, respectively. These two quinones form valuable dyestuff intermediates. For example they can be sulphonated to produce mordant dyes which dye wool red.

The expression triangulene is used in this specification and in the accompanying claims to designate the structure

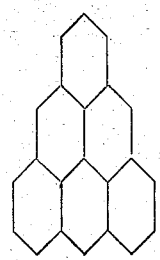

The two series of reactions starting with di-(m-xylyl)-phthalide and di-(p-xylyl)-phthalide are illustrated below under I to VI and VII to XII respectively.

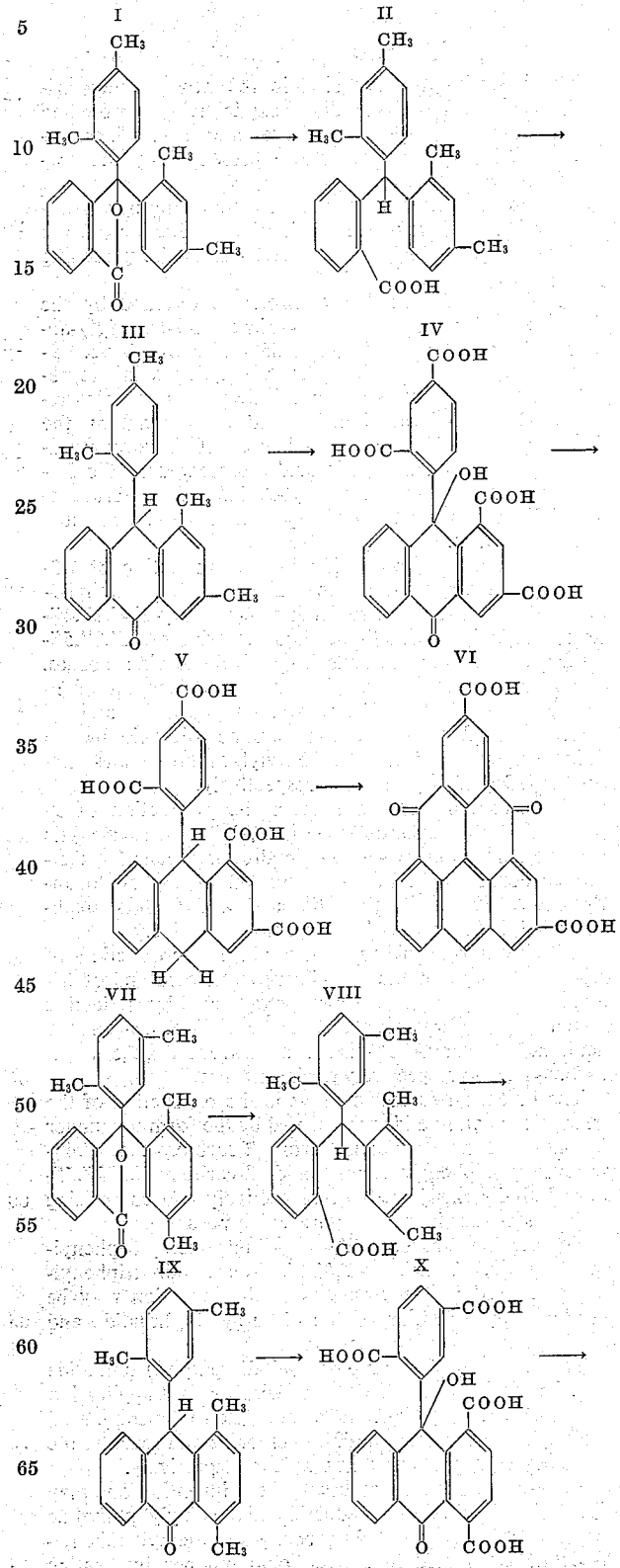

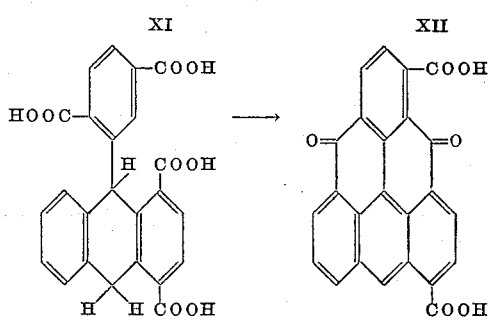

The invention thus consists in the new products triangulene-4,8-quinone-6,10-dicarboxylic acid, represented by the formula under VI above, and triangulene-4,8-quinone-7,11-dicarboxylic acid, represented by the formula under XII above.

The invention also consists in the following new products which are intermediates in the production of the new triangulene compounds referred to in the preceding paragraph:

1,3-dimethyl-9-(m-xylyl)-anthrone represented by the formula under III above. 1,4-dimethyl-9-(p-xylyl)-anthrone represented by the formula under IX above. 9-phenyloxanthranol-1,3,2',4'-tetracarboxylic acid represented by the formula under IV above. 9-phenyloxanthranol-1,4,2',5'-tetracarboxylic acid represented by the formula under X above. 9-phenyl-9,10-dihydroanthracene-1,3,2',4'-tetracarboxylic acid represented by the formula under V above. 9-phenyl-9,10-dihydroanthracene-1,4,2',5'-tetracarboxylic acid represented by the formula under XI above.

The invention also consists in the production of 1,3-dimethyl-9-(m-xylyl)-anthrone and of 1,4-dimethyl-9-(p-xylyl)-anthrone by subjecting 2-carboxy-2',4',2'',4''-tetramethyltriphenylmethane and 2-carboxy-2',5',2'',5''-tetramethyltriphenylmethane respectively to ring closure.

The invention also consists in the production of 9-phenyloxanthranol-1,3,2',4'-tetracarboxylic acid and of 9-phenyloxanthranol-1,4,2',5'-tetracarboxylic acid by the oxidation of 1,3-dimethyl-9-(m-xylyl)-anthrone and 1,4-dimethyl-9-(p-xylyl)-anthrone respectively.

The invention also consists in the production of 9-phenyl-9,10-dihydroanthracene - 1,3,2',4' - tetracarboxylic acid and of 9-phenyl-9,10-dihydroanthracene-1,4,2',5'-tetracarboxylic acid by the reduction of 9-phenyloxanthranol-1,3,2',4'-tetracarboxylic acid and 9-phenyloxanthranol-1,4,2',5'-tetracarboxylic acid respectively.

The invention further consists in the production of triangulene-4,8-quinone-6,10-dicarboxylic acid and of triangulene-4,8-quinone-7,11-dicarboxylic acid by subjecting 9 - phenyl-9,10-dihydroanthracene-1,3,2',4'-tetracarboxylic acid and 9-phenyl-9,10-dihydroanthracene-1,4,2',5'-tetracarboxylic acid respectively to ring closure.

The invention further consists in the production of the triangulene compounds represented by the formulae under VI and XII above starting from 2-carboxy-2',4',2'',4''-tetramethyltriphenylmethane and 2-carboxy-2',5',2'',5''-tetramethyltriphenylmethane respectively and comprising the steps set out in the four preceding paragraphs.

Further the 2-carboxy-2',4',2'',4''-tetramethyltriphenylmethane and 2-carboxy-2',5',2'',5''-tetramethyltriphenylmethane used in the processes of the invention may be produced by reduction of the di-(m-xylyl)-phthalide and di-(p-xylyl)-phthalide respectively.

The di-(m-xylyl)-phthalide and di-(p-xylyl)-phthalide may be produced as described in British patent application No. 18,670/51 by forming a complex of asymmetrical phthalyl chloride and aluminium chloride and reacting the complex with m-xylene and p-xylene respectively.

In carrying out the processes of the invention one may proceed as follows. The reduction of the dixylyl phthalide to the corresponding 2 - carboxy-tetramethyltriphenylmethane is effected in conventional manner by heating with excess zinc dust in alcoholic potassium or sodium hydroxide and the resulting carboxy compound is converted to the corresponding dimethyl-(xylyl)-anthrone by heating in a zinc chloride/sodium chloride melt. Oxidation of the anthrone is then effected by first boiling the anthrone with an excess of dilute nitric acid, e. g. with from 2,500 to 4,000 parts by weight of a 20% aqueous solution of nitric acid per 100 parts by weight of anthrone. The resulting material is then filtered and washed and the residue is dissolved in a slight excess of boiling dilute aqueous solution of caustic alkali. Potassium permanganate is added to the alkaline solution until the permanganate colour is stable to boiling. The manganese dioxide which is formed, is separated by filtration and the resulting 9-phenyloxanthranol tetracarboxylic acid is recovered from the filtrate by acidification with a mineral acid.

In carrying out the above oxidation it is preferred to add a small amount, e. g. 5 to 10 parts by weight per 100 parts by weight of anthrone, of nitrobenzene to the anthrone before treatment with dilute nitric acid is effected. The nitrobenzene is then removed by steam distillation when the heating with dilute nitric acid is completed.

An alternative method of oxidising the anthrone is to heat the anthrone with an aqueous solution of nitric acid, e. g. a 20% by weight solution, at an elevated temperature, e. g. 150 to 250° C. in a sealed tube or vessel.

The reduction of the 9-phenyloxanthranol tetracarboxylic acid produced as above, is effected by dissolving the acid in an aqueous solution of caustic alkali, e. g. a 15% solution, and boiling with excess of zinc dust. After separating the excess zinc dust by filtration, the 9-phenyl-9,10-dihydroanthracene tetracarboxylic acid is recovered from the filtrate by acidification with concentrated hydrochloric acid.

Ring closure of the 9-phenyl-9,10-dihydroanthracene tetracarboxylic acid obtained is carried out by dissolving it in concentrated sulphuric acid, e. g. in an amount equivalent to about ten times the weight of the tetracarboxylic acid, and heating the resulting solution to an elevated temperature, e. g. from 100 to 200° C.

After heating has been completed the material is cooled and diluted, e. g. with water or ice, when the triangulene-4,8-quinone dicarboxylic acid is precipitated. The triangulene-4,8-quinone dicarboxylic acid is separated by filtration and on further cooling of the filtrate a sulphonated triangulene-4,8-quinone dicarboxylic acid is precipitated. This precipitate is washed with concentrated hydrochloric acid to remove sulphuric acid adhering to the material and dried in a vacuum. The amount of sulphonated material obtained depends on the temperature to which the 9-phenyl-9,10-dihydroanthracene tetracarboxylic acid dissolved in sulphuric acid is heated to and also on the time of heating at this temperature i. e. the higher the temperature or the more prolonged the heating, the more sulphonated material is obtained.

The triangulene derivatives of the invention, when sulphonated, yield mordant dyes which dye wool red using Glauber's salt as mordant; the shade may be modified to blue by chroming.

The following examples illustrate the invention.

*Example 1*

Di-(m-xylyl) phthalide (M. P. 168° C.) was reduced with excess zinc dust in 20% alcoholic potassium hydroxide solution to the acid 2-carboxy-2',4',2'',4''-tetramethyltriphenylmethane (M. P. 232° C.) and the latter compound was subjected to ring closure by heating in a zinc chloride/sodium chloride melt (in the ratio of 5 parts to 1 part) at 220° C. to yield the 1,3-dimethyl-9-(m-xylyl)-anthrone (M. P. 165° C.).

76 parts by weight of this anthrone were mixed with 5 parts by weight of nitrobenzene and boiled for 36 hours with excess (about 2500 parts by weight) 20% nitric acid solution. After removal of the nitrobenzene by steam distillation, the residue was filtered, washed with water and dissolved in boiling dilute sodium hydroxide solution. Powdered potassium permanganate was added till the permanganate colour was stable to ten minutes' boiling. The filtrate from manganese dioxide was acidified with concentrated hydrochloric acid and 90 parts by weight of 9-phenyl-oxanthranol-1,3,2',4'-tetracarboxylic acid were obtained. 85 parts by weight of this acid were dissolved in 15% sodium hydroxide solution and reduced with excess zinc dust by boiling for 24 hours. The filtrate from excess zinc was acidified with concentrated hydrochloric acid to give 60 parts by weight of 9-phenyl-9,10-dihydroanthracene-1,3,2',4'-tetracarboxylic acid in good yield. This acid (54 parts by weight) was dissolved in ten times its weight of concentrated sulphuric acid and after heating at 170° C. the solution was diluted with ice at 150° C., when a red precipitate of triangulene-4,8-quinone-6,10-dicarboxylic acid was obtained amounting to 24 parts by weight. The filtrate from this precipitate gave on cooling a quantity of sulphonated condensation product, which was washed with concentrated hydrochloric acid and dried in vacuum; this dried sulphonated material amounted to 15 parts by weight.

*Example 2*

Di-(p-xylyl)-phthalide (M. P. 179° C.) was reduced with excess zinc dust in 20% alcoholic potassium hydroxide solution to the acid 2-carboxy-2',5',2'',5''-tetramethyltriphenylmethane (M. P. 235° C.) and the latter compound was subjected to ring closure by heating in a zinc chloride/sodium chloride melt (in the ratio of 5 parts to 1 part) at 200° C. to yield the 1,4-dimethyl-9-(p-xylyl)-anthrone (M. P. 190° C.).

7.5 parts by weight of this anthrone were mixed with 0.5 part of nitrobenzene and boiled for 36 hours with excess (about 250 parts by weight) 20% nitric acid solution. After removal of the nitrobenzene by steam distillation, the residue was filtered, washed with water and dissolved in boiling dilute sodium hydroxide solution. Powdered potassium permanganate was added till the permanganate colour was stable to 10 minutes boiling. The filtrate from manganese dioxide was acidified with concentrated hydrochloric acid, and 9 parts by weight of 9 - phenyloxanthranol - 1,4,2',5' - tetracarboxylic acid were obtained. 8 parts by weight of this product were dissolved in 15% sodium hydroxide solution and reduced by boiling with excess zinc dust for 24 hours. The filtrate from excess zinc dust was acidified with concentrated hydrochloric acid to give 8 parts by weight of 9-phenyl-9,10-dihydroanthracene - 1,4,2',5' - tetracarboxylic acid. This acid (7 parts by weight) was dissolved in ten times the quantity of concentrated sulphuric acid and after heating at 110° C., the solution was diluted by pouring into water when a red precipitate of triangulene-4,8-quinone-7,11-dicarboxylic acid was obtained which amounted to 2 parts by weight. The filtrate gave on cooling sulphonated triangulene-4,8-quinone-7,11-dicarboxylic acid which was washed with concentrated hydrochloric acid and dried in a vacuum; this dried sulphonated material amounted to 4 parts by weight.

*Example 3*

2 parts by weight of 1,3-dimethyl-9-(m-xylyl)-anthrone (M. P. 165° C.), prepared as in Example 1, was oxidised to 9-phenyloxanthranol-1,3,2',4'-tetracarboxylic acid in 95% of theoretical yield by heating in a sealed vessel at 200° C. for 10 hours with 20% nitric acid solution (20 parts by volume). The oxidation product was reduced with excess zinc-dust by boiling in 15% sodium hydroxide solution for 24 hours. The resulting 9 - phenyl - 9,10 - dihydroanthracene - 1,3,2',4' - tetracarboxylic acid in 78% of theoretical yield was dissolved in ten times its weight of concentrated sulphuric acid and heated at 110° C. The solution when cold was poured into water, and on filtering a red precipitate of triangulene-4,8-quinone-6,10-dicarboxylic acid was obtained, which amounted to 85% of the theoretical yield. The filtrate gave on cooling sulphonated triangulene-4,8-quinone-6,10-dicarboxylic acid which was washed with concentrated hydrochloric acid and dried in vacuum. This dried sulphonated material accounted for a further 5% of the theoretical yield of the triangulene compound.

The 9-phenyloxanthranol-1,3,2',4'-tetracarboxylic acid produced as described in Examples 1 and 3 formed colourless crystals which decomposed at 335–340° C.; it gave a colourless solution in concentrated sulphuric acid which turned blue on heating with powdered copper.

The 9-phenyloxanthranol-1,4,2',5'-tetracarboxylic acid produced as described in Example 2 formed colourless crystals which decomposed at a temperature of over 300° C.; it gave a colourless solution in concentrated sulphuric acid which turned blue on heating with powdered copper.

The 9 - phenyl - 9,10 - dihydroanthracene - 1,3,2',4'-tetra-carboxylic acid and the 9-phenyl-9,10-dihydroanthracene-1,4,2',5'-tetracarboxylic acid produced as described in the examples both gave a yellow solution in concentrated sulphuric acid which changed rapidly to green and then to red violet on heating to 80° C.; the former acid decomposed at a temperature of over 300° C., and the latter acid decomposed at 340–345° C.

The triangulene-4,8-quinone-6,10-dicarboxylic acid and the triangulene-4,8-quinone-7,11-dicarboxylic acid were dark red powders, and both decomposed at high temperatures without melting and gave a violet red solution in concentrated sulphuric acid.

We claim:

1. A product triangulene-4,8-quinone dicarboxylic acid having the formula

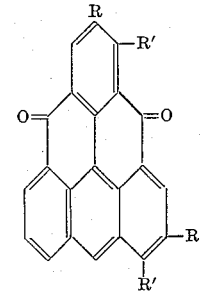

wherein R represents COOH when R' represents H and R' represents COOH when R represents H, R and R' being selected from the group consisting of H and COOH.

2. The production of triangulene-4,8-quinone-6,10-dicarboxylic acid by subjecting 9-phenyl-9,10-dihydroanthracene-1,3,2',4'-tetracarboxylic acid to ring closure.

3. The production of triangulene-4,8-quinone-7,11-dicarboxylic acid by subjecting 9-phenyl-9,10-dihydroanthracene-1,4,2',5'-tetracarboxylic acid to ring closure.

4. A process for the production of triangulene-4,8-quinone-6,10-dicarboxylic acid comprising subjecting 2-carboxy-2',4',2'',4''-tetramethyltriphenylmethane to ring closure in the presence of an acid condensing agent to yield 1,3-dimethyl-9-(m-xylyl)-anthrone, oxidising the said anthrone with nitric acid to yield 9-phenyloxanthranol-1,3,2',4'-tetracarboxylic acid, reducing the tetracarboxylic acid so obtained with zinc dust in dilute caustic alkali solution to yield 9-phenyl-9,10-dihydroanthracene-1,3,2',4'-tetracarboxylic acid and subjecting the last-named tetracarboxylic acid to ring closure in the presence of an acid condensing agent to yield triangulene-4,8-quinone-6,10-dicarboxylic acid.

5. A process for the production of triangulene-4,8-quinone-7,11-dicarboxylic acid comprising subjecting 2-carboxy-2',5',2'',5''-tetramethyltriphenylmethane to ring closure in the presence of an acid condensing agent to yield 1,4-dimethyl-9(p-xylyl)-anthrone, oxidising the said anthrone with nitric acid to yield 9-phenyloxanthranol-1,4,2',5'-tetracarboxylic acid, reducing the tetracarboxylic acid so obtained with zinc dust in dilute caustic alkali solution to yield 9-phenyl-9,10-dihydroanthracene-1,4,2',5' tetracarboxylic acid and subjecting the last-named tetracarboxylic acid to ring closure in the presence of an acid condensing agent to yield triangulene-4,8-quinone-7,11-dicarboxylic acid.

6. The process of claim 4 in which the said 2-carboxy tetramethyltriphenylmethane is produced by the reduction of the corresponding dixylyl phthalide with zinc dust in dilute caustic alkali solution.

7. The process of claim 4 in which ring closure is effected by treatment with an acid condensing agent selected from the group consisting of $H_2SO_4$, $ZnCl_2$ and $AlCl_3$.

8. The process of claim 4 in which the oxidation of the said anthrone is effected by boiling with an excess of dilute aqueous nitric acid followed by treatment with alkaline potassium permanganate solution.

9. The process of claim 4 in which the oxidation of the said anthrone is effected by heating the anthrone with aqueous nitric acid under superatmospheric pressure.

10. The process of claim 4 in which the reduction of the said phenyloxanthranoltetracarboxylic acid is effected by heating with excess zinc dust in dilute caustic alkali solution.

11. The process of claim 5 in which the said 2-carboxy tetramethyltriphenylmethane is produced by the reduction of the corresponding dixylyl phthalide with zinc dust in dilute caustic alkali solution.

12. The process of claim 5 in which ring closure is effected by treatment with an acid condensing agent selected from the group consisting of $H_2SO_4$, $ZnCl_2$ and $AlCl_3$.

13. The process of claim 5 in which the oxidation of the said anthrone is effected by boiling with an excess of dilute aqueous nitric acid followed by treatment with alkaline potassium permanganate solution.

14. The process of claim 5 in which the oxidation of the said anthrone is effected by heating the anthrone with aqueous nitric acid under superatmospheric pressure.

15. The process of claim 5 in which the reduction of the said phenyloxanthranoltetracarboxylic acid is effected by heating with excess zinc dust in dilute caustic alkali solution.

16. As a compound: triangulene-4,8-quinone-6,10-dicarboxylic acid.

17. As a compound: triangulene-4,8-quinone-7,11-dicarboxylic acid.

References Cited in the file of this patent

UNITED STATES PATENTS

| | | |
|---|---|---|
| 1,724,045 | Schumacher | Aug. 13, 1929 |
| 1,751,670 | Braun et al. | Mar. 25, 1930 |
| 2,033,056 | Walker | Mar. 3, 1936 |
| 2,135,062 | Walker | Nov. 1, 1938 |
| 2,454,433 | Cullinan et al. | Nov. 23, 1948 |
| 2,653,853 | Schroeder | Sept. 29, 1953 |

FOREIGN PATENTS

| | | |
|---|---|---|
| 601,856 | France | Dec. 11, 1925 |

OTHER REFERENCES

Weiss et al.: Monatshefte für Chemie, 1926, vol. 47, pp. 308–9.

Weiss et al.: Monatshefte für Chemie, 1932, vol. 59, pp. 129–30.

Elsevier's Encyclopedia of Organic Chemistry, series III, v. 14, pages 491 (1940).